(12) United States Patent
Humer et al.

(10) Patent No.: US 12,367,020 B2
(45) Date of Patent: Jul. 22, 2025

(54) DOMAIN SPECIFIC INLINING FOR INTERPRETERS

(71) Applicant: Oracle International Corporation, Redwood Shores, CA (US)

(72) Inventors: Christian Humer, Zurich (CH); Daniele Bonetta, Amsterdam (NL)

(73) Assignee: Oracle International Corporation, Redwood Shores, CA (US)

( * ) Notice: Subject to any disclaimer, the term of this patent is extended or adjusted under 35 U.S.C. 154(b) by 173 days.

(21) Appl. No.: 18/319,339

(22) Filed: May 17, 2023

(65) Prior Publication Data
US 2023/0376290 A1 Nov. 23, 2023

Related U.S. Application Data

(60) Provisional application No. 63/343,532, filed on May 18, 2022.

(51) Int. Cl.
*G06F 8/41* (2018.01)
*G06F 9/455* (2018.01)

(52) U.S. Cl.
CPC ............ *G06F 8/423* (2013.01); *G06F 8/4443* (2013.01); *G06F 9/4552* (2013.01)

(58) Field of Classification Search
CPC .......................... G06F 8/41–51; G06F 9/4552
USPC .................................................. 717/140–161
See application file for complete search history.

(56) References Cited

U.S. PATENT DOCUMENTS

| | | | | |
|---|---|---|---|---|
| 6,658,655 | B1 * | 12/2003 | Hoogerbrugge | G06F 9/3885 717/136 |
| 8,762,974 | B1 * | 6/2014 | Smith | G06F 8/423 717/152 |

FOREIGN PATENT DOCUMENTS

WO  WO-0210909 A2 *  2/2002  ........... G06F 8/4441

OTHER PUBLICATIONS

Niephaus, Fabio, et al., GraalSqueak: A Fast Smalltalk Bytecode Interpreter Written in an AST Interpreter Framework, ICOOOLPS '18, 6 pages, Jul. 2018, [retrieved on Dec. 30, 2024], Retrieved from the Internet: <URL:http://dl.acm.org/>.*
Stefan Brunthaler. 2010. Efficient Interpretation Using Quickening. SIGPLAN Not. 45, 12 (Oct. 1, 2010), 1-14. https://doi.org/10.1145/1899661.1869633, 13 pages.
Brian Davis, Andrew Beatty, Kevin Casey, David Gregg, and John Waldron. 2003. The Case for Virtual Register Machines. In Proceedings of the 2003 Workshop on Interpreters, Virtual Machines and Emulators (San Diego, California) (IVME '03). Association for Computing Machinery, New York, NY, USA, 41-49. https://doi.org/10.1145/858570.858575, Jun. 12, 2003, 9 pages.
Eric Jonas, Johann Schleier-Smith, Vikram Sreekanti, Chia-Che Tsai, Anurag Khandelwal, Qifan Pu, Vaishaal Shankar, Joao Carreira, Karl Krauth, Neeraja Yadwadkar, et al. 2019. Cloud programming simplified: A Berkeley view on Serverless Computing. arXiv preprint arXiv:1902.03383 (2019), Feb. 9, 2019, 33 pages.
Todd A. Proebsting. 1995. Optimizing an ANSI C Interpreter with Superoperators. In Proceedings of the 22nd ACM SIGPLAN-SIGACT Symposium on Principles of Programming Languages-(San Francisco, California, USA) (POPL '95). Association for Computing Machinery, New York, NY, USA, 322-332. https://doi.org/10.1145/199448.199526, Jan. 1, 1995, 11 pages.

(Continued)

*Primary Examiner* — Geoffrey R St Leger
(74) *Attorney, Agent, or Firm* — Lathrop GPM LLP

(57) ABSTRACT

Domain specific inlining for interpreters includes obtaining an interpreter source code including compiler directives. A host compilation is performed on the interpreter source code to obtain a compiled interpreter. Performing host compilation includes inlining code blocks based on the plurality of compiler directives. The compiled interpreter is outputted.

18 Claims, 7 Drawing Sheets

(56) References Cited

OTHER PUBLICATIONS

Gülfem Savrun-Yeniçeri, Wei Zhang, Huahan Zhang, Eric Seckler, Chen Li, Stefan Brunthaler, Per Larsen, and Michael Franz. 2014. Efficient Hosted Interpreters on the JVM. ACM Trans. Archit. Code Optim. 11, 1, Article 9 (Feb. 2014), 24 pages. https://doi.org/10.1145/2532642, Feb. 1, 2014, 24 pages.

Manuel Serrano. 2018. JavaScript AOT Compilation. SIGPLAN Not. 53, 8 (Oct. 2018), 50-63. https://doi.org/10.1145/3393673.3276950, Nov. 6, 2018, 14 pages.

Manuel Serrano. 2021. Of JavaScript AOT Compilation Performance. Proc. ACM Program. Lang. 5, ICFP, Article 70 (Aug. 2021), 30 pages. https://doi.org/10.1145/3473575, Aug. 1, 2021, 30 pages.

Gregory T. Sullivan, Derek L. Bruening, Iris Baron, Timothy Garnett, and Saman Amarasinghe. 2003. Dynamic Native Optimization of Interpreters. In Proceedings of the 2003 Workshop on Interpreters, Virtual Machines and Emulators (San Diego, California) (IVME '03). Association for Computing Machinery, New York, NY, USA, 50-57. https://doi.org/10.1145/858570.858576, Jun. 12, 2003, 8 pages.

Christian Wimmer and Thomas Würthinger. 2012. Truffle: A Self-Optimizing Runtime System. In Proceedings of the 3rd Annual Conference on Systems, Programming, and Applications: Software for Humanity (Tucson, Arizona, USA) (SPLASH '12). Association for Computing Machinery, New York, NY, USA, 13-14. https://doi.org/10.1145/2384716.2384723, Oct. 19-26, 2012, 2 pages.

Thomas Würthinger, Christian Wimmer, Christian Humer, Andreas Wöß, Lukas Stadler, Chris Seaton, Gilles Duboscq, Doug Simon, and Matthias Grimmer. 2017. Practical Partial Evaluation for High-Performance Dynamic Language Runtimes. In Proceedings of the 38th ACM SIGPLAN Conference on Programming Language Design and Implementation (Barcelona, Spain) (PLDI 2017). Association for Computing Machinery, New York, NY, USA, 662-676. https://doi.org/10.1145/3062341.3062381, Jun. 18-23, 2017, 15 pages.

Haoran Xu and Fredrik Kjolstad. 2021. Copy-and-Patch Compilation: A Fast Compilation Algorithm for High-Level Languages and Bytecode. Proc. ACM Program. Lang. 5, OOPSLA, Article 136 (Oct. 2021), https://doi.org/10.1145/3485513, Oct. 1, 2021, 30 pages.

* cited by examiner

*500 Example Interpreter Code*

```
1  // Signal that this is a bytecode interpreter loop
2  @BytecodeInterpreterSwitch
3  @ExplodeLoop(kind = LoopExplosionKind.MERGE_EXPLODE)
4  public void execute () {
5      int bci = 0;
6      while (bci < ops.length) {
7          switch (ops[bci ++]) {
8              case 0:
9                  // direct call: will be inlined
10                 directCall (21, 21);
11             break;
12             case 1:
13                 // @TruffleBoundary annotated method: not inlined
14                 truffleBoundary ();
15             break;
16             case 2:
17                 // block protected behind inIntepreter: not inlined
18                 if (CompilerDirectives.inInterpreter ()) {
19                     protectedByInIntepreter ();
20                 }
21             break;
22             case 3:
23                 // operation dominated by transferToInterpreter API
24                 // will not be inlined
25                 CompilerDirectives.transferToInterpreterAndInv ();
26                 dominatedByTransferToInterpreter ();
27             break;
28             case 4:
29                 // simple (first level) recursion is inlined
30                 recursive (5);
31             break;
32             case 5:
33                 for (int y = 0; y < polymorphic.length; y++) {
34                     // virtual or polymorhic calls: not inlined
35                     polymorphic[y].execute ();
36                     virtualCall();
37                 }
38             break;
39             default: // ignore this branch and don't inline
40                 throw CompilerDirectives.shouldNotReachHere ();
41         }
42     }
43 }
```

*FIG. 5*

600 Example Interpreter

```
1  static class SumNode extends Node {
2      // this AST node has two children
3      @Child Node left;
4      @Child Node right;
5      // exclude from partial evaluation
6      @TruffleBoundary
7      private void genericSum (...) { ...}
8      // interpreter execution entry point
9      Object execute () {
10         // evaluate children
11         Object l = left.execute ();
12         Object r = right.execute ();
13         // runtime type guard
14         if (integerType(l, r) && !overflow(l,r)) {
15             // fast , small -integer sum
16             return integerSum(l, r);
17         } else {
18             // slow , generic case
19             return genericSum(l, r);
20         }
21     }
22 }
```

FIG. 6

DOMAIN SPECIFIC INLINING FOR INTERPRETERS

CROSS-REFERENCE TO RELATED APPLICATIONS

This application is a nonprovisional application of, and thereby claims benefit under 37 U.S.C. § 119(e) to, U.S. Patent Application Ser. No. 63/343,532. U.S. Patent Application Ser. No. 63/343,532 is incorporated herein by reference in its entirety.

BACKGROUND

User level programs are programs that execute above the operating system and use the resources of the computer. User level programs may be executed by an interpreter and/or compiled by a compiler. An interpreter is a program that is capable of executing source code. A compiler transforms the source code into another form, such as machine code. When the code is transformed, an interpreter is not required to execute the program. Each choice has advantages and disadvantages.

SUMMARY

In general, in one aspect, one or more relates to a method that includes obtaining an interpreter source code including compiler directives. A host compilation is performed on the interpreter source code to obtain a compiled interpreter. Performing host compilation includes inlining code blocks based on the plurality of compiler directives. The method further comprises outputting the compiled interpreter.

In general, in one aspect, one or more relates to a system includes memory and a computer processor executing a compiler to perform operations. The operations include obtaining an interpreter source code that includes compiler directives, performing a host compilation on the interpreter source code to obtain a compiled interpreter. Performing host compilation includes inlining code blocks based on the compiler directives. The operations further include outputting the compiled interpreter.

In general, in one aspect, one or more relates to a non-transitory computer readable storage medium comprising computer readable program code for causing a computer system to perform operations that includes obtaining an interpreter source code including compiler directives. A host compilation is performed on the interpreter source code to obtain a compiled interpreter. Performing host compilation comprising inlining code blocks based on the compiler directives. The operations further include outputting the compiled interpreter.

Other aspects of the invention will be apparent from the following description and the appended claims.

BRIEF DESCRIPTION OF DRAWINGS

FIG. 5 shows an example interpreter code section in accordance with one or more embodiments.

FIG. 6 shows an example interpreter code section in accordance with one or more embodiments.

Like elements in the various figures are denoted by like reference numerals for consistency.

DETAILED DESCRIPTION

In general, embodiments of the invention are directed to using compiler directives when performing host compilation of interpreter source code to decide whether to inline the code blocks of the interpreter. An interpreter is a computer program that directly executes a user level program written in a programming or scripting language, without requiring the user level program previously to have been compiled into a machine language program. An interpreter is programming language specific in that the interpreter is specifically defined for programming language of the user level program. The programming language is the domain.

During execution of the user level program, efficiencies can be achieved by compiling at least a portion of the code blocks of the user level program. For example, the code blocks of the user level program that are frequently executed may be compiled while other code blocks are not compiled. The act of compiling a user level program is referred to as guest compilation.

The compiler is not specific to the programming language of the user level program. Rather, the compiler uses the instructions of the interpreter in compiling the user level program. To assist in making compiling decisions, such as which code blocks of the user level program to compile, the compiler uses compiler directives that are written in the interpreter. The compiler directives are directives to the compiler that assist the compiler in performing guest compilation of the user level program.

One or more embodiments are directed to repurposing the compiler directives when performing host compilation of the interpreter. The interpreter is a program that is fully compiled prior to the execution of the user level program. One aspect of compiling a program such as the interpreter is performing optimizations, such as inlining. Inlining is the process of replacing a subroutine or function call at the call site with the body of the subroutine or function being called. Embodiments repurpose the previously defined compiler directives in the interpreter in order to make decisions as to which subroutines or function calls to inline Because the interpreter is language specific, the compiler directives for the user level program are also indicative of the code paths of the interpreter that would be more frequently executed for the particular language. Without using the compiled directives, the compiler would apply generic, built-in, optimizations to each code path, resulting in suboptimal selection of code blocks to inline By compiling the program using the information of the compiler directives, one or more embodiments improve the inlining decisions may be suboptimal.

Figure 1:
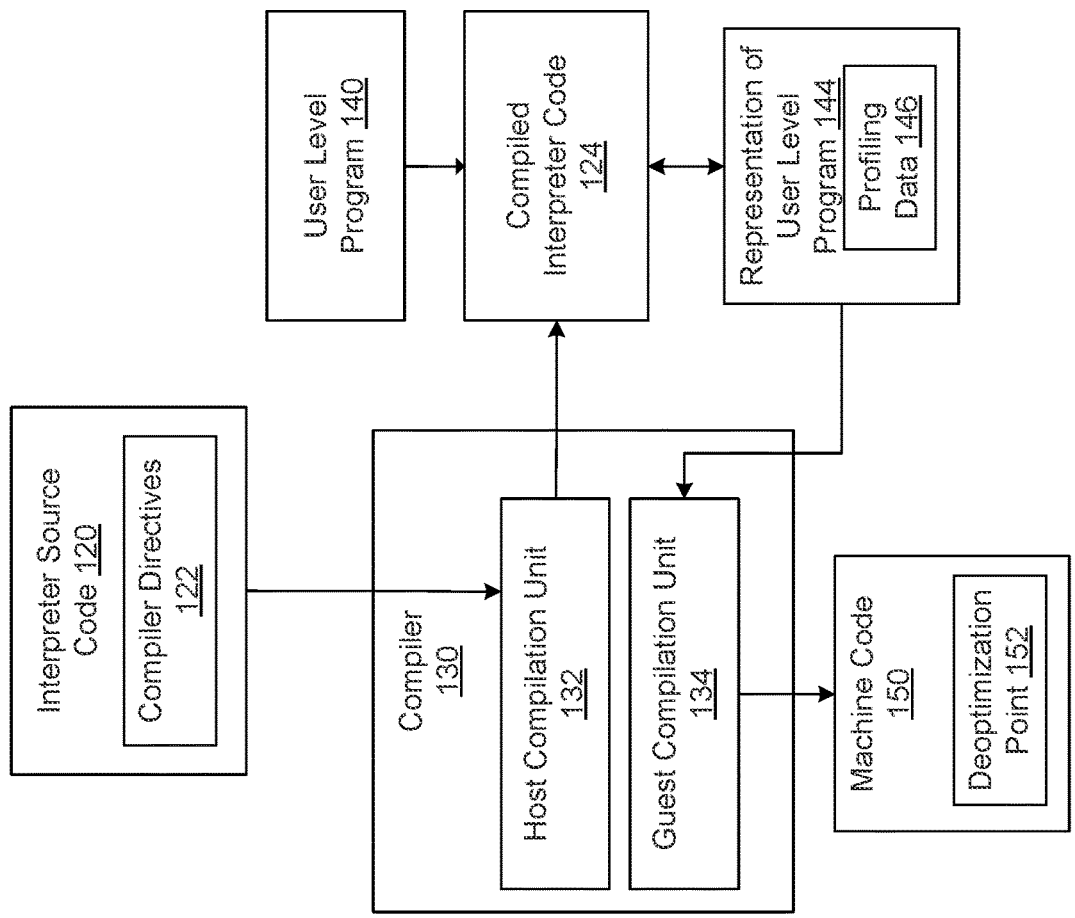
FIG. 1 shows a diagram of a system in accordance with one or more embodiments.

Turning to the Figures, FIG. 1 shows a diagram of a system in accordance with one or more embodiments. As shown in FIG. 1, the system includes interpreter source code (120) connected to a compiler (130). The interpreter source code (120) is source code that defines the interpreter. The interpreter is written in a first programming language and is configured to interpret the instructions of a second programming language that is usually different from the first programming language. Namely, the interpreter source code (120) is in the first programming language. The interpreter is specific to the second programming language. For example, when a language implementer (e.g., a user) wants to define a new programming language, the language implementer writes an interpreter source code for the new programming language to interpret the new programming language. The language implementer often has domain knowledge of the second programming language. For example, the domain knowledge may include which types of instructions of the second programming language are more likely to be executed based on the purpose of the language, which types of instructions of the second programming language may benefit from compiler optimizations, and which types of instructions should be executed by the interpreter. Because of the domain knowledge, the language implementer includes compiler directives (122) in the interpreter source code (120).

Compiler directives (122) are directions for the compiler that are used by the compiler to make optimization decisions regarding compiling the user level program (140). Compiler directives do not have an effect when executed within an interpreter, without the compiler. Compiler directives (122) may be in the form of specific function calls or annotations. Compiler directives may be compiler exclude directives or compiler include directives. Compiler exclude directives are directions to the compiler that indicates optimizations or compiling should not be performed for a particular corresponding code block. Compiler include directives are directions that indicate that compiling and optimizations should be performed for a particular corresponding code block. Example compiler exclude directives include partial evaluation boundary, inInterpreter directive to indicate to the compiler to stop compiling, TransferToInterpreter and invalidate directive to indicate that compiler should discontinue compilation at the code position and invalidate the currently executing machine code, interpreterOnly to indicate that the corresponding code block should only be executed by the interpreter, a recursive directive for recursive function calls, and a polymorphic directive for polymorphic function calls. Example compiler include directives may be the opposite of the compiler exclude directives that cause the compiler to compile a particular code block.

In one or more embodiments, the format and location of the compiler directives (122) in the interpreter source code (120) are unchanged. Rather, the same compiler directives at the same location are used when performing the compilation of the interpreter source code (120).

The interpreter source code (120) is connected to a compiler (130). The compiler (130) is a program that is configured to execute on a computer system and transform a program to the bytecode or object code, or some other program representation. The compiler (130) is configured to compile source code written in the first programming language. The compiler (130) includes a host compilation unit (132) for compiling interpreter source code (120) into compiled interpreter code (124). The host compilation unit (132) includes an inliner (not shown). The inliner is configured to evaluate the cost and benefit of inlining a subroutine and performing an inlining operation Inlining is the process of copying the callee code into the caller body at the callsite. Thus, the call is replaced with the code being called. The cost of inlining a subroutine is the code size to the callee code. The benefit of inlining a subroutine may be in further optimizations that can be performed (e.g., modifications of how instructions are executed, etc.). The inliner of the host compilation unit (132) may include a domain specific inlining phase and a general purpose phase. The domain specific inlining phase uses the above compiler directives to determine whether to inline portions of the interpreter source code (120). In particular, the domain specific inlining phase does not inline code blocks of the interpreter source code (120) that have corresponding compiler exclude directives. Remaining code sections may be inlined depending on other parameters. Namely, whereas previously, the host compilation unit (132) did not consider compiler directives when making inlining decisions for the interpreter source code (120), embodiments of the invention provide a technique for domain specific inlining using the compiler directives by the domain specific inlining phase of the host compilation unit. The general purpose phase is a general purpose inlining phase.

The host compilation unit (132) creates the compiled interpreter code (124), which may be a native bytecode. The compiled interpreter code (124) may then be used to execute a user level program (140). Specifically, the compiled interpreter code (124) may execute a representation of the user level program (144). For example, the representation may be an abstract syntax tree representation. The user level program (140) includes application level code that is interpreted. The user level program (140) is written in a second programming language, which is usually different from the first programming language. For example, user level program may be JAVASCRIPT code or other type of code that is interpreted. When executing target code sections, optimizations may be performed using profiling data (146) generated during runtime during execution. One type of optimization is to compile portions of the user level program (144) and generate machine code (150) therefrom.

Machine code (150) is generally faster to execute but has overhead associated with the execution. Further, certain optimizations may be performed during compilation that are not performed when the user level program (140) is executed by the interpreter.

Returning to the compiler (130), the compiler (130) includes a guest compilation unit (134). The guest compilation unit (134) compiles the user level program (140) using the interpreter source code (120). Because the user level program is written in a programming language not implemented by the compiler, guest compilation involves using the code of the interpreter as a basis for interpreting the instructions of the user level program when performing the compilation. The code of the corresponding instructions of the interpreter is combined with the code of the user level program when generating the machine code. The compiler directives (122) are used to make various compiling decisions on the user level program. Namely, the compiler directives (122) in the interpreter source code (120) are also used to determine which portions of the user level program (140) to compile, which to inline, and which to perform other operations.

The machine code (150) may also include a deoptimization point (152). A deoptimization point (152) is a location in the machine code whereby execution is transferred back to the interpreter (i.e., to be interpreted by the compiled interpreter code (124)). As such, portions of the user level program (140) may be executed by the compiled interpreter code executing the representation of the user level program (144) while other portions of the user level program (140) are executed by executing the machine code (150). The procedure of switching back and forth between the compiled form (i.e., machine code (150)) and interpreted form (i.e., representation of user level program (144)) is referred to as partial evaluation. A partial evaluation boundary is a location specified by the compiler directives, whereby the switch occurs. Partial evaluation is described in U.S. Pat. No. 8,930,920, which is incorporated herein by reference in its entirety.

While FIG. 1 shows a configuration of components, other configurations may be used without departing from the scope of the invention. For example, various components may be combined to create a single component. As another example, the functionality performed by a single component may be performed by two or more components. The various components of FIG. 1 may be used to perform the operations of FIGS. 2-4 and may be executed on the computing system described in FIG. 7A and FIG. 7B.

Figure 2:
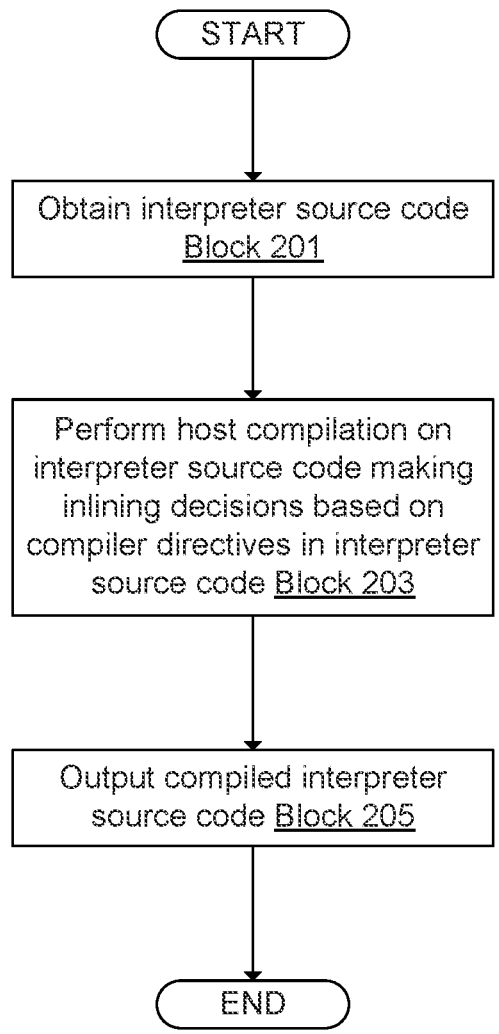
FIG. 2 shows a flowchart for compiling an interpreter in accordance with one or more embodiments.
Figure 3:
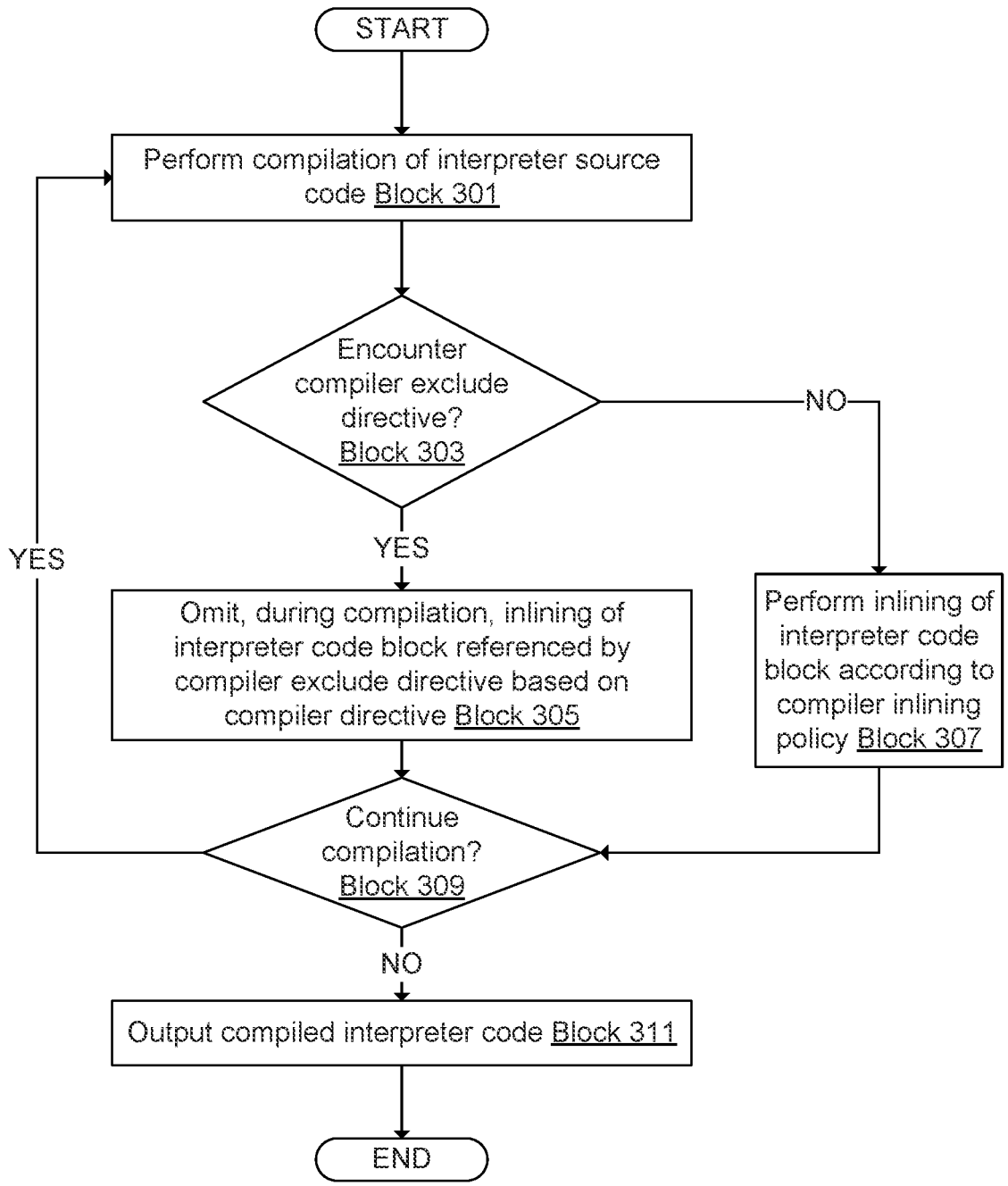
FIG. 3 shows a more detailed flowchart for compiling an interpreter in accordance with one or more embodiments.
Figure 4:
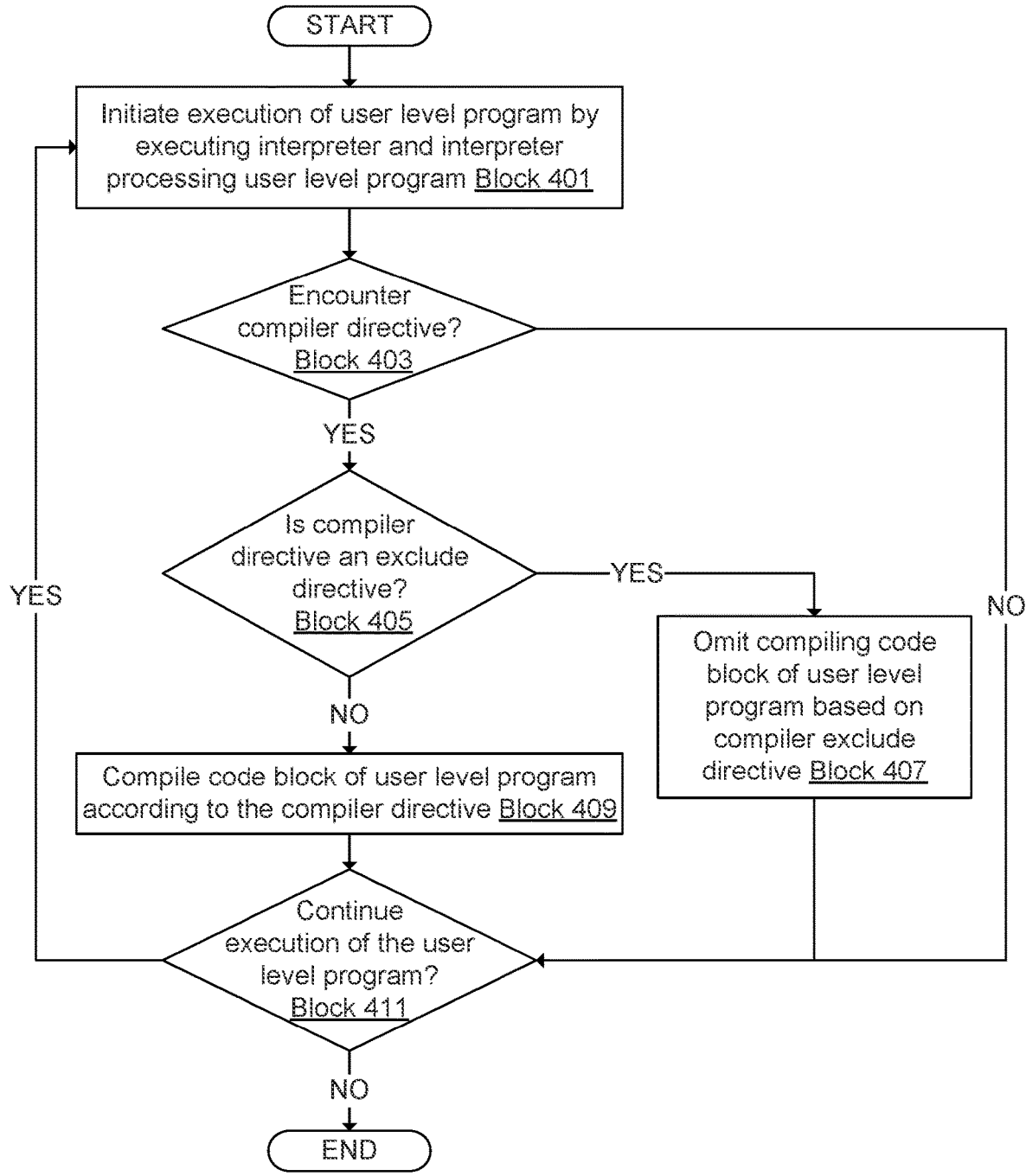
FIG. 4 shows a flowchart for executing a user level program using an interpreter in accordance with one or more embodiments.

FIGS. 2-4 show flowcharts in accordance with one or more embodiments. While the various steps in these flowcharts are presented and described sequentially, at least some of the steps may be executed in different orders, may be combined, or omitted, and at least some of the steps may be executed in parallel. Furthermore, the steps may be performed actively or passively.

FIG. 2 shows a flowchart for compiling an interpreter source code in one or more embodiments. In Block 201, interpreter source code is obtained. For example, a language interpreter may specify the interpreter source code for an interpreter that implements a target programming language. Instructions of the interpreter defined how to interpret (i.e., the operations to perform) different instruction types that may exist in any user level program written in the target programming language. Thus, the interpreter includes, for each type of instructions of the target programming language, the corresponding operations to perform, whereby the operations are defined in a programming language of the compiler. Notably, at this stage, the user level program may be undefined or even unknown. However, the language implementer may have domain knowledge of the target programming language. For example, the language implementer may recognize that certain instruction types are rarely executed. Thus, the language implementer adds compiler directives to be used when performing various compiling operations including optimization or whether to compile decisions for the user level program. In one or more embodiments, the language implementer does not modify the compiler directives for making inlining decisions when compiling the interpreter source code. The compiling of the interpreter source code is then triggered by a compiler.

In Block 203, host compilation is performed on interpreter source code. Inlining decisions are made based on the compiler directives in the interpreter source code. During compilation, call graph of the interpreter source code is generated. The call graph relates a callsite in the caller to the callee (i.e., the subroutine being called in the caller). For an interpreter, the call graph may specify, for example, that for a particular instruction type of the target programming language, a particular callee having a subroutine is used. The interpreter source code may include compiler directive associated with the callsite. If the compiler directive is a compiler exclude directive, then the domain specific inlining stage does not inline the code of the callee into the caller at the callsite. For example, the compiler exclude directive is reinterpreted to mean that inlining the callee would have too great of a cost. Notably, the compiler exclude directive may be interpreted used in a different way than defined. For example, the compiler exclude directive may be to execute the callee by the interpreter and not compile the callee. However, in the example, because the entire interpreter source code is compiled, the compiler exclude directive is ineffectual as to performing the operations expressly defined. Rather, the compiler exclude directive is reinterpreted to mean that the cost of inlining the callee is too great as compared to the benefit.

After performing the domain specific inlining phase, the generic inlining phase may be performed. The generic inlining phase may inline the remaining portions of the interpreter source code based on other parameters or perform a greedy based inlining.

In some embodiments, the generic inlining phase does not inline the code blocks of the interpreter source code skipped by the domain specific inlining phase because of compiler exclude directives.

In other embodiments, the generic inlining phase may optionally inline code blocks of the interpreter source code skipped by the domain specific inlining phase because of compiler exclude directives when thresholds, such as code size of the caller are not satisfied. In such embodiments, the compiler exclude directives are used to identify which code blocks of the interpreter to inline only if there is sufficient value after performing inlining of other code blocks that are unrelated to compiler exclude directives.

In Block 205, the compiled interpreter source code is outputted. Specifically, the compiled interpreter source code may be stored or installed. At this stage, the compiler interpreter source code may be used to interpret user level programs written in the target programming language.

FIG. 3 shows a more detailed flowchart for compiling an interpreter in accordance with one or more embodiments. In Block 301, compilation of the interpreter source code is performed. The compilation is initiated as described above with reference to Block 203 of FIG. 2. To compile a program, a call graph and control flow graph is generated. The call graph represents the relationship between subroutines (or methods) in the program being compiled. The subroutine performing the call is referred to as a caller, and the subroutine being called is the callee. The location in the caller that includes the instruction for the call is the call site. A call graph may be represented as a call tree whereby, for each call site, each subroutine is included as a separate call graph node. The control flow graph is a representation, using graph notation, of the paths that might be traversed through a target program during the execution of the target program. Individual nodes in the control flow graph correspond to one or more instructions of the target program. Thus, the control-flow graph represents the control flow between the instructions of the program. Nodes in the control flow graph may be associated with individual analysis information that is used during compilation. The process of compiling a program involves switching between an expansion phase of expanding the call graph and the control flow graph and an optimization phase in which optimizations are performed. For example, an optimization may be to inline a callee's code into the caller. By performing the inlining, overhead associated with call linkage between the caller and callee may be avoided. Further, additional optimizations may be performed, such as through moving instructions, removing branches, and performing other optimizations. Determining whether to inline a caller into a callee is based on an inlining benefit calculation. The inlining benefit calculation that uses the estimation of the benefit of inlining based on optimizations that may be performed along with the size of the callee. The inlining benefit is increased based on the estimated frequency of executing the callee.

With an interpreter, the domain of the interpreter is unknown to the compiler. Thus, which branches of the interpreter are more frequently executed may be unknown to the compiler. As such, the compiler may give equal weights to the branches without further information.

During compilation, a determination is made whether a compiler exclude directive is encountered in Block 303. The compiler exclude directive is interpreted by the compiler during compilation of the interpreter source code to mean that the particular code block is less frequently executed or unlikely to be executed. Thus, if a compiler exclude directive is encountered, then during compilation, inlining of the interpreter code block that is referenced by the compiler exclude directive is omitted in Block 305. The compiler exclude directive is related to a code block of the interpreter code. The code block may include one or more callsites. For each callsite in the code block, inlining of the callee is not performed.

In some embodiments, omitting the inlining is only delayed until after the domain specific inlining phase. After inlining is performed during the domain specific inlining phase by omitting the inlining of the interpreter code blocks referenced by the compiler exclude directive and inlining the rest according to the inlining benefit calculation, the generic inlining phase may be performed. During the generic inlining phase, the interpreter code blocks referenced by the compiler exclude directives that were omitted during the domain specific inlining phase may be inlined if code size is less than the threshold. In such a scenario, omitting the inlining during the domain specific inlining phase gives preference to other code blocks of the interpreter that are not referenced by compiler exclude directives.

Continuing with FIG. 3, when compiler exclude directives are not encountered, in Block 307, inlining of the interpreter code block is performed according to a compiler inlining policy. The inlining policy may be, for example, performing the inlining benefit calculation to calculate the inlining benefit value for each callsite and, inlining the callsite when the inlining benefit value is greater than a threshold.

In Block 309, a determination is made whether to continue compilation. If a determination is made to continue compilation, the compilation of the interpreter source code continues until the interpreter is compiled to generated compiled interpreter code. Further inlining may be performed based on the call graph expansion. Although FIG. 3 is focused on the inlining operations to perform the compiling, additional operations are performed that are not shown in FIG. 3, which are common for compilers to generate compiled interpreter code.

FIG. 4 shows a flowchart for executing a target code using an interpreter in accordance with one or more embodiments. Specifically, FIG. 4 shows the execution using a compiled interpreter code generated from FIG. 3. In Block 401, execution of a user level program by executing interpreter and interpreter processing of the user level program is initiated. Execution of the user level is triggered. The triggering of the execution of the user level program triggers the execution of the interpreter. The interpreter then starts interpreting the instructions of the user level program. During execution, certain portions of the program may be executed by the interpreter, and certain portions may be executed by executing the machine code that is compiled. Namely, execution switches between using the machine code version and the interpreter processing the representation of the user level program. The switching is partial evaluation, such as described in U.S. Pat. No. 8,930,920. During execution, compilation of the user level program may be triggered. The compilation is performed by a just in time compiler. The triggering of compiling a portion of the user level program may be based, for example, on a determination that the execution of a portion is satisfies a threshold, such as based on the frequency of execution, based on a number of times that the portion is executed, or based on another metric.

In Block 403, a determination is made whether a compiler directive is encountered during execution. If a compiler directive is encountered, a determination is made whether the compiler directive is a compiler exclude directive in Block 405. If the compiler directive is a compile exclude directive, then the compiling of the code block of the user level program is omitted based on the compiler exclude directive in Block 407. For example, if the machine code is being executed, the processing may switch to the interpreter executing the user level program. If the machine code is not be executed, the processing may continue with the interpreter executing the user level program.

If the compiler directive is not a compile exclude directive, the compiler directive may be a compiler include directive. In such a scenario, the code block of the user level program is compiled according to the compiler directive in Block 409. For example, if the machine code is not be executed, the processing may switch to compiling and executing the machine code. Compiling the code block includes combining the compiled instructions of the interpreter with the code block of the user level program. Thus, even though the user level program is in a different and unrecognized programming language than the compiler generally compiles, the compiler is able to compile the user level program using the interpreter.

Blocks 403-409 are performed by executing the specific compiler directive. Specifically, rather than executing the conditional expressions set forth in Blocks 403 and 405, the instructions triggered by the compiler directives are executed. The result of executing the instructions triggered by the compiler directives may be Blocks 403-409.

In Block 411, a determination is made whether to continue execution of the user level program. Determining to continue is based on the execution path in the user level program. If the determination is made to continue execution, then execution continues with Block 401. Otherwise, execution proceeds to end.

The following examples are for explanatory purposes only and not intended to limit the scope of the invention. FIG. 5 shows an example interpreter code section (500) in accordance with one or more embodiments. Specifically, FIG. 5 shows depicts a simplified TRUFFLE bytecode interpreter with the corresponding inlining decisions (demarcated by "//" using the inlining technology described in the present application. As specified in lines 9 and 10, direct calls may be inlined. As specified in lines 13-14, 17-19, and 23-26, respectively, partial evaluation boundaries, inInterpreter, and transfer to interpreter and invalidate are not inlined. Further, as defined in lines 29-30 and 34-36, respectively, recursive and polymorphic calls are not inlined.

FIG. 6 shows an example interpreter code section (600) in accordance with one or more embodiments. Specifically, FIG. 6 shows a simplified example of an abstract syntax tree (AST) interpreter. The Java class in FIG. 6 corresponds to an AST node: it extends classes provided by the Truffle framework (e.g., Node), and uses JAVA method calls such as CompilerDirectives to instruct the compiler about specific properties of the interpreter. The AST interpreter in FIG. 6 corresponds to a simple interpreter to execute binary expressions (e.g., a sum operator). The result of the binary operator depends on the actual (runtime) types of the two operands.

The Truffle interpreter might implement a specialized "fastpath" handling for small integers (line 16) and might delegate to a slower, more complex method (line 19) for other types (e.g., to implement string concatenation). In the example of FIG. 6, the interpreter can signal the just in time (JIT) compiler that the "slow" method of the user level program being interpreted by the interpreter should not be considered for runtime compilation via partial evaluation. To this end, the method is annotated with the @TruffleBoundary annotation in line 6. The annotation is related to the generic sum method in line 7.

Without using embodiments described herein, when the interpreter itself is compiled, both the integerSum and the genericSum may have equal inlining benefit values. However, using embodiments described herein, domain knowledge imparted by the @Truffle boundary annotation is indicative to the compiler that the generic sum should not inlined when compiling the interpreter. Thus, the compiler may elect to inline the integerSum method when compiling the interpreter. Also, the first two calls in lines 11 and 12 of left.execute and right.execute are recursive calls and, thus, will not be inlined. Because the integerSum method is inlined, a more optimal version of the interpreter is created causing faster execution.

Figure 7A:
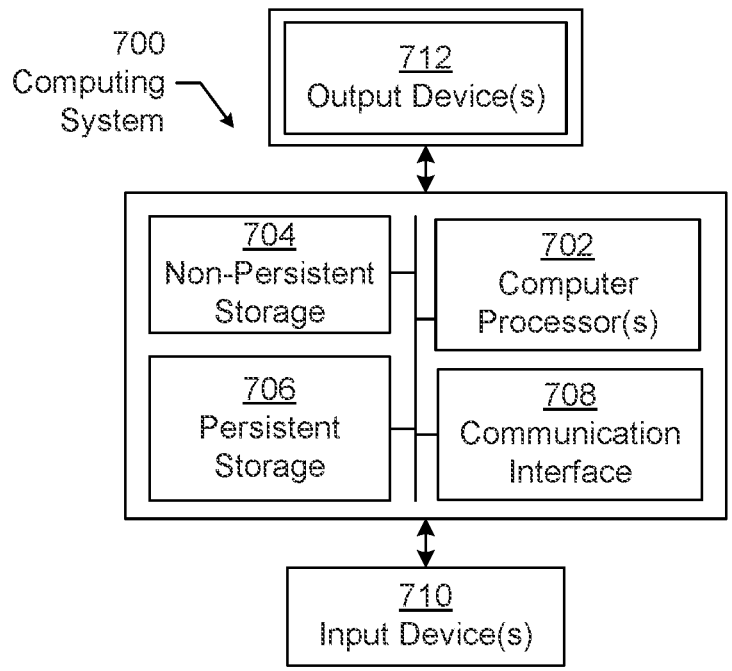
FIG. 7A and FIG. 7B show a computing system in accordance with one or more embodiments.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 7A, the computing system (700) may include one or more computer processors (702), non-persistent storage (704), persistent storage (706), a communication interface (708) (e.g., Bluetooth interface, infrared interface, network interface, optical interface, etc.), and numerous other elements and functionalities that implement the features and elements of the disclosure. The computer processor(s) (702) may be an integrated circuit for processing instructions. The computer processor(s) may be one or more cores or micro-cores of a processor. The computer processor(s) (702) includes one or more processors. The one or more processors may include a central processing unit (CPU), a graphics processing unit (GPU), a tensor processing units (TPU), combinations thereof, etc.

The input devices (710) may include a touchscreen, keyboard, mouse, microphone, touchpad, electronic pen, or any other type of input device. The input devices (710) may receive inputs from a user that are responsive to data and messages presented by the output devices (712). The inputs may include text input, audio input, video input, etc., which may be processed and transmitted by the computing system (700) in accordance with the disclosure. The communication interface (708) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the output devices (712) may include a display device, a printer, external storage, or any other output device. One or more of the output devices may be the same or different from the input device(s). The input and output device(s) may be locally or remotely connected to the computer processor(s) (702). Many different types of computing systems exist, and the aforementioned input and output device(s) may take other forms. The output devices (712) may display data and messages that are transmitted and received by the computing system (700). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments, which may include transmitting, receiving, presenting, and displaying data and messages described in the other figures of the disclosure.

Figure 7B:
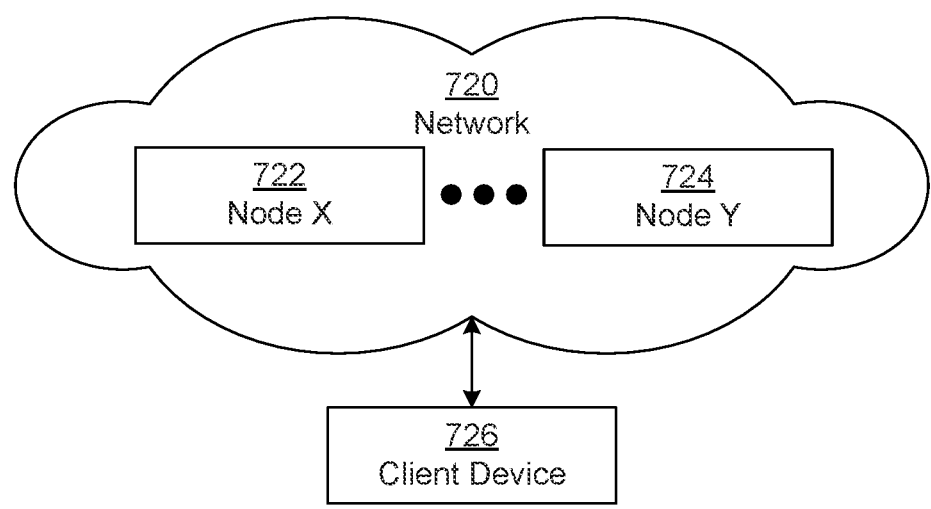

The computing system (700) in FIG. 7A may be connected to or be a part of a network. For example, as shown in FIG. 7B, the network (720) may include multiple nodes (e.g., node X (722), node Y (724)). Each node may correspond to a computing system, such as the computing system shown in FIG. 7A, or a group of nodes combined may correspond to the computing system shown in FIG. 7A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (700) may be located at a remote location and connected to the other elements over a network.

The nodes (e.g., node X (722), node Y (724)) in the network (720) may be configured to provide services for a client device (726), including receiving requests and transmitting responses to the client device (726). For example, the nodes may be part of a cloud computing system. The client device (726) may be a computing system, such as the computing system shown in FIG. 7A. Further, the client device (726) may include and/or perform all or a portion of one or more embodiments.

The computing system of FIG. 7A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
   obtaining an interpreter source code comprising a plurality of compiler directives;
   performing a host compilation on the interpreter source code to obtain a compiled interpreter, wherein performing host compilation comprises inlining code blocks based on the plurality of compiler directives, wherein performing the host compilation comprises:
      initiating compiling the interpreter source code; and
      inlining, during compiling the interpreter source code, an interpreter code block according to a compiler inlining policy based on a lack of a compiler exclude directive; and
   outputting the compiled interpreter.

2. The method of claim 1, further comprising:
   executing a user level program by executing the compiled interpreter and performing interpreter processing of the user level program.

3. The method of claim 1, further comprising:
   initiating execution of a user level program by executing the compiled interpreter and performing interpreter processing of the user level program;
   encountering, while executing the user level program, a compiler directive of the plurality of compiler directives, wherein the compiler directive is for a code block of the user level program, wherein the compiler directive is the compiler exclude directive; and
   omitting compiling the code block of the user level program based on the compiler directive being the compiler exclude directive.

4. The method of claim 1, further comprising:
   initiating execution of a user level program by executing the compiled interpreter and performing interpreter processing of the user level program;
   encountering, while executing the user level program, a compiler directive of the plurality of compiler directives, wherein the compiler directive is for a code block of the user level program; and
   compiling the code block of the user level program according to the compiler directive.

5. The method of claim 1, wherein the plurality of compiler directives comprises at least one selected from a group consisting of a partial evaluation directive, an inInterpreter directive, a transfer to interpreter directive, a recursive directive, and a polymorphic directive.

6. The method of claim 1, wherein performing the host compilation comprises:
   initiating compiling the interpreter source code;
   encountering the compiler exclude directive of the plurality of compiler directives when compiling the interpreter source code; and
   omitting, during compiling the interpreter source code, inlining of a second interpreter code block referenced by the compiler exclude directive based on the compiler exclude directive.

7. A method comprising:
   obtaining an interpreter source code comprising a plurality of compiler directives;
   performing a host compilation on the interpreter source code to obtain a compiled interpreter, wherein performing host compilation comprises inlining code blocks based on the plurality of compiler directives, wherein performing the host compilation comprises:
      initiating compiling the interpreter source code;
      encountering a compiler exclude directive of the plurality of compiler directives when compiling the interpreter source code; and
      omitting, during compiling the interpreter source code, inlining of an interpreter code block referenced by the compiler exclude directive based on the compiler exclude directive; and
   outputting the compiled interpreter.

8. A system comprising:
   memory;
   a computer processor executing a compiler to perform operations comprising:
      obtaining an interpreter source code comprising a plurality of compiler directives;
   performing a host compilation on the interpreter source code to obtain a compiled interpreter, wherein performing host compilation comprises inlining code blocks based on the plurality of compiler directives, wherein performing the host compilation comprises:
      initiating compiling the interpreter source code; and
      inlining, during compiling the interpreter source code, an interpreter code block according to a compiler inlining policy based on a lack of a compiler exclude directive; and
      outputting the compiled interpreter.

9. The system of claim 8, wherein the computer processor is further configured to execute a user level program by executing the compiled interpreter and performing interpreter processing of the user level program.

10. The system of claim 8, wherein the computer processor is further configured to:
    initiate execution of a user level program by executing the compiled interpreter and performing interpreter processing of the user level program;
    encounter, while executing the user level program, a compiler directive of the plurality of compiler directives, wherein the compiler directive is for a code block of the user level program, wherein the compiler directive is the compiler exclude directive; and
omit compiling the code block of the user level program based on the compiler directive being the compiler exclude directive.

11. The system of claim 8, wherein the computer processor is further configured to:
initiate execution of a user level program by executing the compiled interpreter and performing interpreter processing of the user level program;
encounter, while executing the user level program, a compiler directive of the plurality of compiler directives, wherein the compiler directive is for a code block of the user level program; and
compile, by the compiler, the code block of the user level program according to the compiler directive.

12. The system of claim 8, wherein performing the host compilation comprises:
initiating compiling the interpreter source code;
encountering the compiler exclude directive of the plurality of compiler directives when compiling the interpreter source code; and
omitting, during compiling the interpreter source code, inlining of a second interpreter code block referenced by the compiler exclude directive based on the compiler exclude directive.

13. A non-transitory computer readable storage medium comprising computer readable program code for causing a computer system to perform operations comprising:
obtaining an interpreter source code comprising a plurality of compiler directives;
performing a host compilation on the interpreter source code to obtain a compiled interpreter, wherein performing host compilation comprises inlining code blocks based on the plurality of compiler directives, wherein performing the host compilation comprises:
initiating compiling the interpreter source code; and
inlining, during compiling the interpreter source code, an interpreter code block according to a compiler inlining policy based on a lack of a compiler exclude directive; and
outputting the compiled interpreter.

14. The non-transitory computer readable storage medium of claim 13, wherein the operations further comprise:
executing a user level program by executing the compiled interpreter and performing interpreter processing of the user level program.

15. The non-transitory computer readable storage medium of claim 13, wherein the operations further comprise:
initiating execution of a user level program by executing the compiled interpreter and performing interpreter processing of the user level program;
encountering, while executing the user level program, a compiler directive of the plurality of compiler directives, wherein the compiler directive is for a code block of the user level program, wherein the compiler directive is the compiler exclude directive; and
omitting compiling the code block of the user level program based on the compiler directive being the compiler exclude directive.

16. The non-transitory computer readable storage medium of claim 13, wherein the operations further comprise:
initiating execution of a user level program by executing the compiled interpreter and performing interpreter processing of the user level program;
encountering, while executing the user level program, a compiler directive of the plurality of compiler directives, wherein the compiler directive is for a code block of the user level program; and
compiling the code block of the user level program according to the compiler directive.

17. The non-transitory computer readable storage medium of claim 13, wherein performing the host compilation comprises:
initiating compiling the interpreter source code;
encountering the compiler exclude directive of the plurality of compiler directives when compiling the interpreter source code; and
omitting, during compiling the interpreter source code, inlining of a second interpreter code block referenced by the compiler exclude directive based on the compiler exclude directive.

18. The non-transitory computer readable storage medium of claim 13, wherein the plurality of compiler directives comprises at least one selected from a group consisting of a partial evaluation directive, an inInterpreter directive, a transfer to interpreter directive, a recursive directive, and a polymorphic directive.

\* \* \* \* \*